(12) United States Patent
Gassman (10) Patent No.: US 6,276,385 B1
(45) Date of Patent: Aug. 21, 2001

(54) PLUG AND SEAT POSITIONING SYSTEM FOR CONTROL APPLICATIONS

(75) Inventor: George W. Gassman, Marshalltown, IA (US)

(73) Assignee: Fisher Controls International, Inc., Austin, TX (US)

(*) Notice: Subject to any disclaimer, the term of this patent is extended or adjusted under 35 U.S.C. 154(b) by 0 days.

(21) Appl. No.: 09/591,372

(22) Filed: Jun. 9, 2000

(51) Int. Cl.[7] .................................................. F16K 31/02
(52) U.S. Cl. ......................... 137/1; 251/129.04; 137/554
(58) Field of Search .......................... 251/129.04, 41; 137/554, 1, 487.5

(56) References Cited

U.S. PATENT DOCUMENTS

| 4,509,403 | 4/1985 | Gassman et al. . |
| 4,747,424 | * 5/1988 | Chapman ................................ 137/1 |
| 5,318,064 | * 6/1994 | Reinicke ........................... 137/487.5 |
| 5,532,925 | 7/1996 | Gassman . |
| 5,564,470 | * 10/1996 | Denmark et al. ..................... 137/554 |
| 5,884,894 | 3/1999 | Smith . |
| 5,950,668 | * 9/1999 | Baumann ..................... 251/129.04 X |

FOREIGN PATENT DOCUMENTS 0 827 056 A2   3/1998  (EP) .

* cited by examiner

*Primary Examiner*—Kevin Lee
(74) *Attorney, Agent, or Firm*—Marshall, O'Toole Gerstein, Murray & Borun (57) ABSTRACT

A control system for positioning a control valve is disclosed. The control system employs first and second control loops, and a plug and seat valve assembly. The first control loop monitors a position or variable of the valve or device being controlled and compares it to a provided setpoint to generate a setpoint for the plug and seat valve. The second control loop compares the measured position of the plug and seat valve to the second setpoint to generate a correction signal to accurately position the plug and seat valve. By employing first and second control loops, the accuracy and responsiveness to which the control valve is positioned is improved.

27 Claims, 7 Drawing Sheets

PLUG AND SEAT POSITIONING SYSTEM FOR CONTROL APPLICATIONS

FIELD OF THE INVENTION

The present invention generally relates to positioners for moving a valve to a desired position and, more particularly, relates to control systems for such positioners.

BACKGROUND OF THE INVENTION

In the transmission of fluids through pipelines, processing facilities, and the like, it is necessary to control valves within the system accurately and quickly. For example, in petroleum processing plants or chemical manufacturing facilities integrated control schemes often require various valves throughout the system to be opened and closed in sequence, and to various degrees, depending upon a given set of operating parameters. Those operating parameters may include a desired flow rate, a timed release of fluid, the particular fluid being processed, etc.

As such control systems become increasingly automated, it is imperative that the control valves be positioned accurately and responsively. Any lag time between receipt of a position command signal, and the actual positioning of the valve to the desired location detrimentally affects the process in terms of productivity and profitability.

As a result, systems have been developed for responsively positioning a control valve. For example, in one of my previous inventions, disclosed in U.S. Pat. No. 4,509,403, assigned to the present assignee, a positioner system is provided which employs a single feedback loop for dynamically controlling the position of a valve. In addition, U.S. Pat. No. 5,884,894 discloses a positioning system employing first and second control loops for controlling the position of a spool valve. However, spool valves typically exhibit high leakage, and if designed to exhibit less leakage, result in a relatively large "dead zone" in the operating range of the valve. This detrimentally affects responsiveness of the valve. Moreover, such spool valves need to be manufactured to close tolerances, increasing the cost of the valve.

SUMMARY OF THE INVENTION

In accordance with one aspect of the invention, a control valve assembly is provided which comprises a control valve, a plug and seat valve, a first position sensor, a second position sensor, and a comparator. The plug and seat valve is operatively associated with the control valve. The first position sensor is adapted to monitor the position of the control valve and generate a first position signal. The second position sensor is adapted to monitor the position of the plug and seat valve and generate a second position signal. The comparator is adapted to compare the first position signal to a first setpoint and generate a second setpoint, and is further adapted to compare the second position signal to the second setpoint and generate a correction signal. The correction signal is communicated to the plug and seat valve for positioning the control valve.

In accordance with another aspect of the invention, a valve control system is provided which comprises a control valve, a control valve actuator, a first position sensor, a plug and seat valve, a first comparator, a second position sensor, a second comparator, and a transducer. The control valve actuator is operably associated with the control valve and is adapted to modify the position of the control valve. The first position sensor is proximate the control valve and is adapted to sense the position of the control valve. The first position sensor generates a signal indicative of the control valve position. The plug and seat valve is in fluid communication with the control valve actuator and is adapted to generate a pressure signal for use by the control valve actuator. The first comparator is adapted to compare the control valve position to a control valve setpoint and generate a plug and seat valve position setpoint. The second position sensor is proximate the plug and seat valve and is adapted to sense the position of the plug and seat valve and generate a signal indicative of the plug and seat valve position. The second comparator is adapted to compare the plug and seat valve position to the plug and seat valve position setpoint and generate a plug and seat valve correction signal. The transducer is adapted to receive the plug and seat valve correction signal and generate a corresponding pressure signal for communication to the plug and seat valve.

In accordance with another aspect of the invention, a system for positioning a control valve driven by a control valve actuator, wherein the control valve actuator is in communication with a plug and seat valve, comprises a first control loop and a second control loop. The first control loop compares a signal indicative of control valve position to a first setpoint to generate a second setpoint. The second control loop compares a signal indicative of plug and seat valve position to the second setpoint to generate a control valve actuator drive signal, the control drive actuator drive signal being communicated to the control valve actuator for positioning the control valve.

In accordance with another aspect of the invention, a system for positioning a control valve driven by a control valve actuator is provided wherein the control valve actuator is in communication with a control valve actuator valve. The system includes a first control loop, a second control loop, and a tunable gain adjustment circuit. In the first control loop a signal indicative of control valve position is compared to a first setpoint to generate a second setpoint. In the second control loop a signal indicative of control valve actuator valve position is compared to the second setpoint to generate a control valve actuator drive signal, the control valve actuator drive signal is communicated to the control valve actuator for positioning the control valve. The tunable gain adjustment circuit is in the second control loop and is adapted to modify the signal indicative of control valve actuator valve position.

In accordance with another aspect of the invention, a method for positioning a control valve is provided which comprises the steps of monitoring the position of the control valve, comparing the position of the control valve to a first setpoint, generating a second setpoint based on the comparing step, monitoring the position of a plug and seat valve, comparing the position of the plug and seat valve to the second setpoint, generating a correction signal based on the comparison of the plug and seat valve position to the second setpoint, and positioning the control valve based on the correction signal.

These and other aspects and features of the invention will become more apparent from the following detailed description when taken in conjunction with the accompanying drawings.

While the invention is susceptible to various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention as defined by the appended claims.

DETAILED DESCRIPTION OF THE PREFERRED EMBODIMENTS

Figure 1:
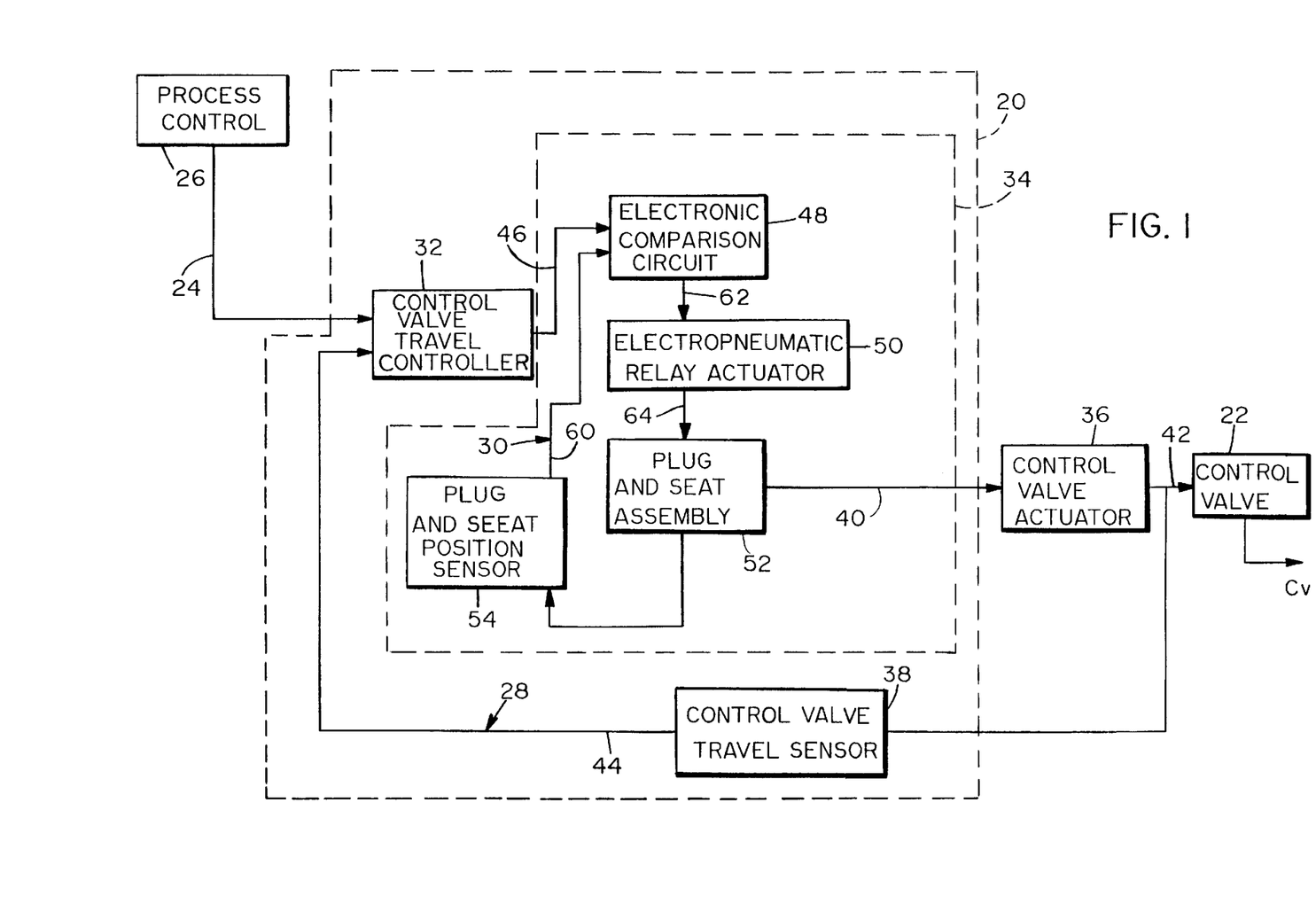
FIG. 1 is a block diagram of a preferred embodiment of a positioning system constructed in accordance with the teachings of the invention.

Referring now to the drawings, and with specific reference to FIG. 1, a control valve positioning system constructed in accordance with the teachings of the invention is generally depicted by reference numeral 20. As shown therein, the positioning system 20 is used to control the position of a control valve 22, based on a control valve travel setpoint 24 received from a process control 26. The process control 26 may be provided as part of an integrated system for controlling such variables as pressure, flow, tank level, temperature, or the like in various environments such as a petroleum processing plant, a chemical processing plant, a natural gas pipeline, or the like.

Referring again to FIG. 1, the positioning system 20 is shown to include a first control loop 28 and a second control loop 30 which provide enhanced damping and combine to more accurately and responsively match the actual position of the control valve 22 to that of the control valve travel setpoint 24. The first control loop 28 preferably employs a control valve processor 32, a plug and seat positioning system 34, a control valve actuator 36, and a control valve travel sensor 38. The control valve actuator 36 is preferably of a type which receives a pneumatic or other pressurized signal 40 and converts the signal 40 to a corresponding mechanical motion 42 for driving the control valve 22 to the desired position as dictated by the setpoint 24. Any number of such actuators are commercially available such as that disclosed in U.S. Pat. No. 4,509,403, assigned to present assignee, the disclosure of which is herein incorporated by reference. The first control loop 28 may be implemented via digital circuitry, analog circuitry, or a hybrid combination of digital and analog circuitry.

The control valve travel sensor 38 is positioned proximate the control valve actuator 36 and control valve 22 to monitor the position thereof. In the preferred embodiment, the position of the control valve actuator 36 is monitored, but it is to be understood that in alternative embodiments, the control valve travel sensor 38 could be employed to monitor the position of the control valve 22 instead. The control valve travel sensor 38 is preferably in the form of a potentiometer. Alternatively, the control valve travel sensor 38 can be in the form of a Hall effect sensor wherein a magnet would be positioned next to the control valve actuator 36 and any movement of the control valve actuator 36 would result in a change in the magnetic field of the magnet, or it can be the form of a number of other position sensors including giant magnetoresistive devices (GMRs), or other electronic sensors.

The control valve travel sensor 38 generates a control valve travel signal 44 indicative of the position of the control valve actuator 36, with the signal 44 being fed to the control valve processor 32. At the control valve processor 32, the control valve travel signal 44 is compared to the control valve travel setpoint 24 to generate a position command setpoint 46. The electronic circuit used to make the comparison of the control valve travel signal 44 and the control valve travel setpoint 24 can be implemented using analog electronic circuitry, digital electronic circuitry, as with a microprocessor, or can be a combination of analog and digital mechanisms. The control valve travel signal 44 can be continuously supplied to the control valve processor 32, or can be operated on a duty cycle basis to take readings at sequenced intervals to thereby reduce power dissipation when beneficial. The control valve processor 32 may include a deviation amplifier or a comparator, or may include gain, bias, and filtering capabilities to improve positioning performance.

The position command setpoint 46 is fed to the second control loop 30 which forms the plug and seat positioning system 34. More specifically, the plug and seat positioning system 34 includes a positioning processor or electronic comparison circuit 48, an electropneumatic relay actuator 50, a control valve actuator valve preferably in the form of a plug and seat valve assembly 52, and a plug and seat valve position sensor 54. The control valve actuator valve may be provided in the form of other types of valves including, but not limited to, spool valves.

The plug and seat valve assembly 52 is employed to generate the pneumatic or pressurized actuation signal 40 for delivery to a control valve actuator 36. As described above, the control valve actuator 36 uses the pressure signal 40 to create mechanical motion 42 for driving the control valve 22 to a desired position. The mechanics and function of the plug and seat valve assembly 52 are described in further detail herein.

A plug and seat valve position sensor 54 is positioned proximate the plug and seat valve assembly 52 to monitor the position of the plug and seat valve assembly 52 and generate a signal 60 indicative of the position of the plug and seat valve assembly 52. The plug and seat valve position sensor 54 can be in the form the aforementioned potentiometers, Hall effect sensors, giant magnetoresistive devices (GMRs), or other electronic sensing means.

The plug and seat valve position signal 60 is fed to the positioning processor 48, which in turn compares the plug and seat valve position sensor signal 60 to the position command setpoint 46 received from the control valve processor 32. It is to be understood that while two processors 32, 48 are depicted, a single processor can be provided capable of performing both tasks.

The positioning processor 48 generates a plug and seat valve drive or correction signal 62 based on a comparison of a plug and seat valve position signal 60, and the position command setpoint 46. The drive or correction signal 62 is connected to the electromagnetic relay actuator 50, which converts the electrical signal 62 to a pneumatic or pressure signal 64, which in turn is used by the plug and seat valve assembly 52 in generating the actuator pressure signal 40. The electropneumatic relay actuator 50 can be provided in any of a number of commercially available current to pressure (I to P) converters or transducers such as that disclosed in one of my previous patents, U.S. Pat. No. 5,532,925, assigned to the present assignee, the disclosure of which is herein incorporated by reference.

Figure 2:
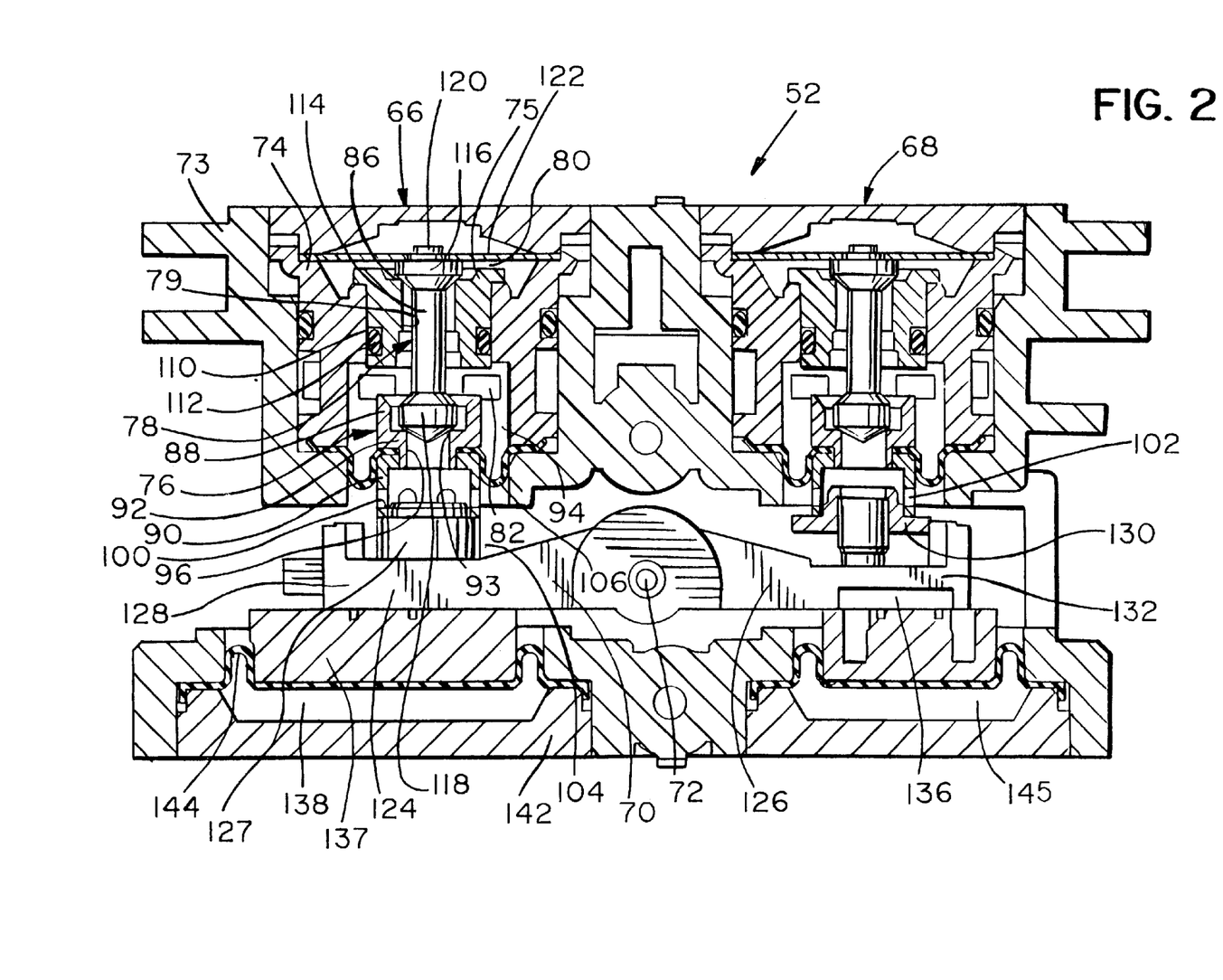
FIG. 2 is a sectional view of a preferred embodiment of a plug and seat valve constructed in accordance with the teachings of the invention and depicted in a closed position.
Figure 3:
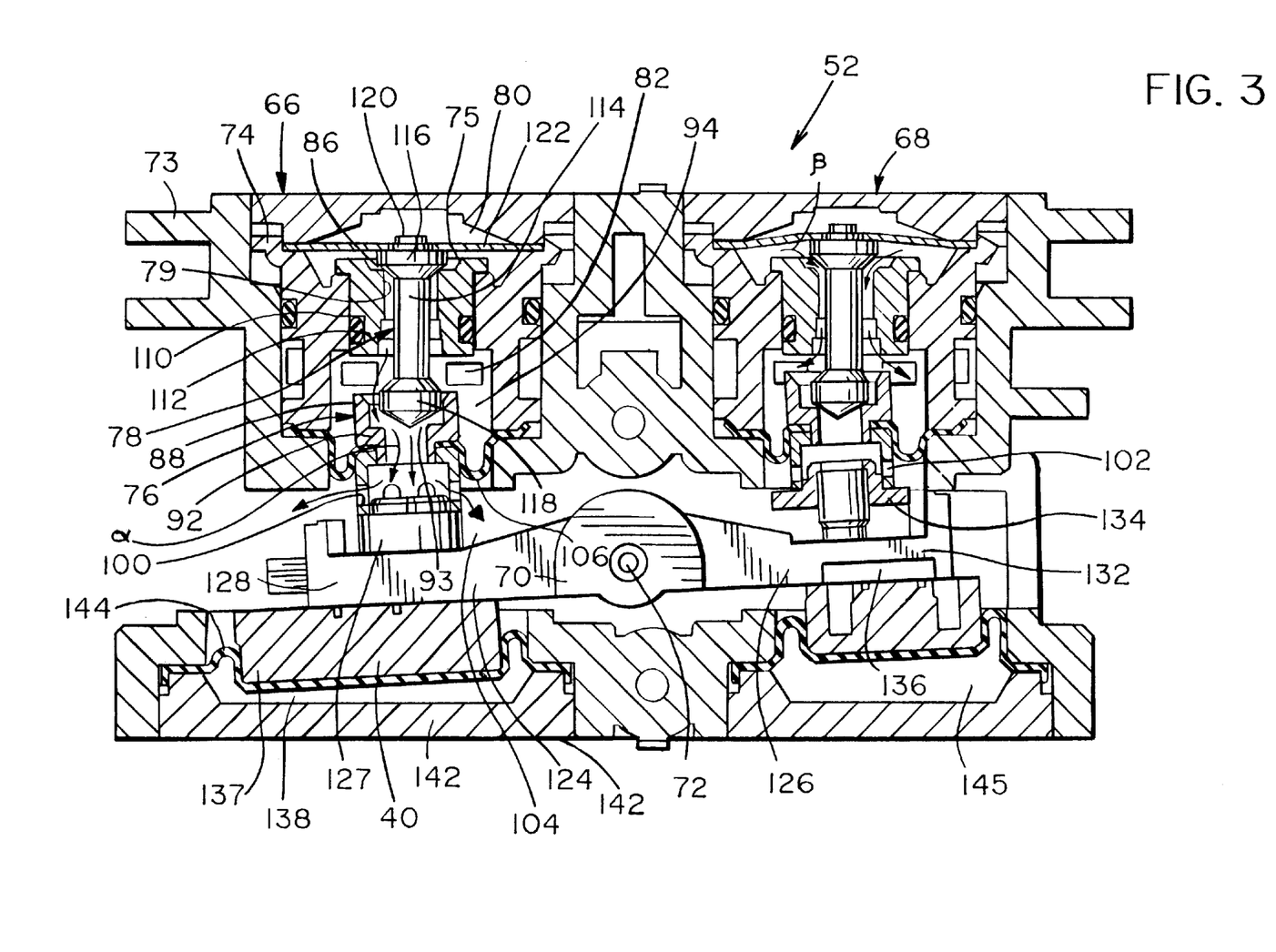
FIG. 3 is a sectional view of the plug and seat valve similar to FIG. 2, but depicting the plug and seat valve in a first open position.
Figure 4:
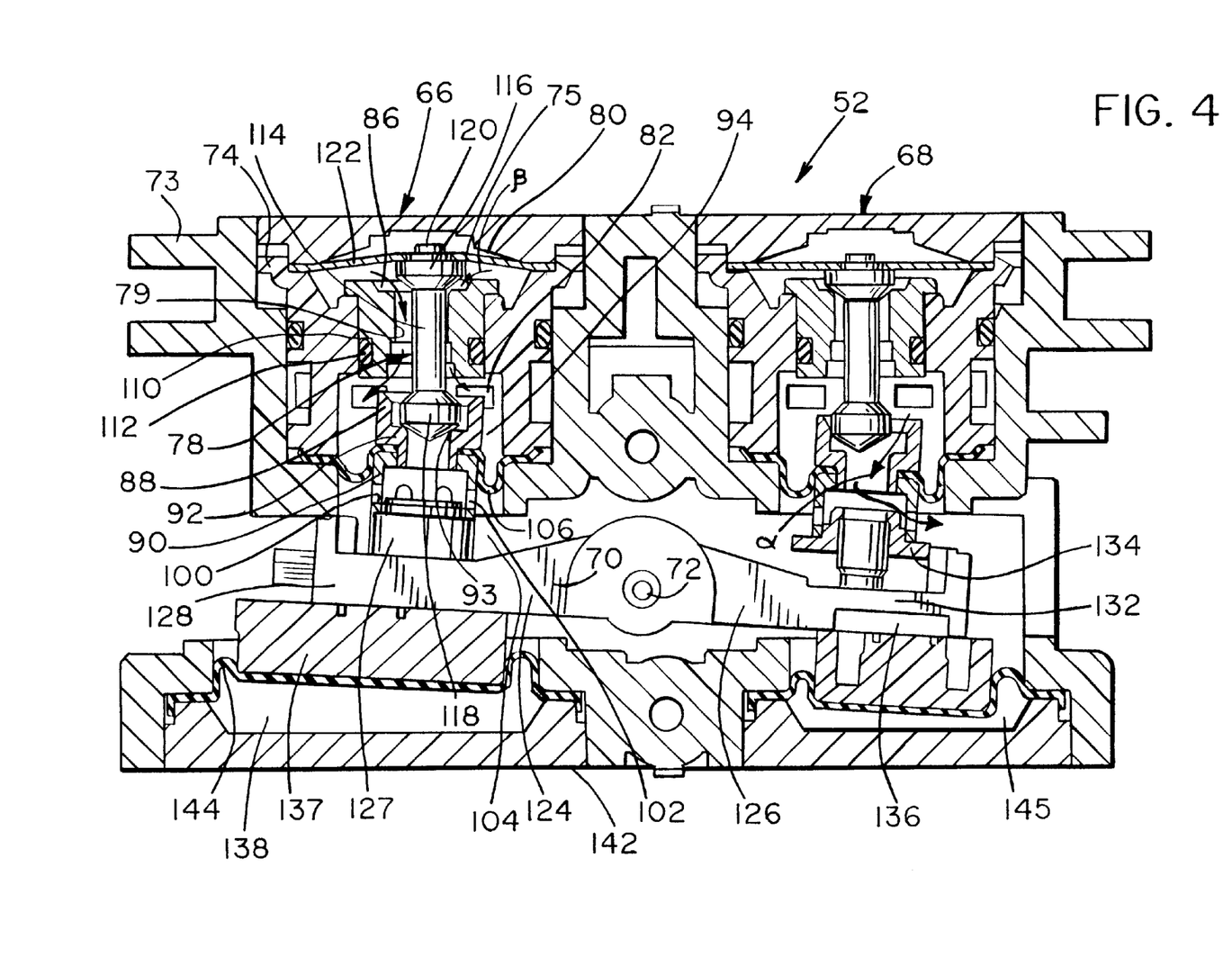
FIG. 4 is a sectional view of the plug and seat valve similar to FIG. 2, but depicting the plug and seat valve in a second open position.

Referring now to FIGS. 2–4, a first preferred embodiment of a plug and seat valve assembly 52 constructed in accordance with the teachings of the invention is depicted. As indicated above, the plug and seat valve assembly 52 receives a pneumatic actuation signal 64 and generates a pneumatic actuation signal 40 for communication to the control valve actuator 36. In the preferred embodiment, two pneumatic outputs are generated to, for example, operate the upper and lower pressure chambers of a piston actuator (not shown). As shown in the figures, the plug and seat valve assembly 52 includes first and second plug and seat valves 66, 68. The first and second plug and seat valves 66, 68 are identical in construction. Accordingly, for ease of reading and comprehension, only the first plug and seat valve 66 is fully enumerated in the drawings. It is to be understood, however, that where like elements are depicted, like reference numerals would apply.

The first and second plug and seat valves 66, 68 are tied together by an actuation beam 70 to move in unison, but in opposing directions. The actuation beam 70 rotates upon a central pivot 72. When one of the first and second plug and seat valves 66, 68 opens, the other of the first and second plug and seat valves 66, 68 closes, or at least closes to the same degree that the other valve opens. In so doing, output signals from the first and second plug and seat valves 66, 68 can both be utilized in controlling, for example, the aforementioned piston actuator or various parameters of an integrated control scheme.

Each of the first and second plug and seat valves 66, 68 is mounted within a main housing 73, and includes a fixed housing member 74 to which a collet 75 is attached. A movable housing member 76 is received within each fixed housing member 74. A movable plug 78 is positioned within a central bore 79 of each collet 75, as will be described in further detail herein. Depending upon the positions of the movable housing members 76 and plugs 78 with respect to the fixed housing members 74, pneumatic pressure of varying force can be fed to the control valve actuator 36 to control its respective position.

Each fixed housing member 74 includes a supply pressure inlet 80 and radially extending outlets 82. The supply pressure inlet 80 is in fluid communication with a source (not shown) of supply pressure for operating the valves 66, 68. One of the central bores 79 connects one of the inlets 80 to one of the outlets 82. A fixed valve seat 86 is provided in each collet 75 between the inlet 80 and the central bore 79 thereof.

The movable housing member 76 includes an upper ring 88 and a lower ring 90. The upper ring 88 includes annular shoulder 92 defining a movable valve seat 93 and is received within a recess 94 of the fixed housing member 74. A communication channel 96 fluidically connects the upper ring 88 to the lower ring 90. The lower ring 90 includes an annular shoulder 100 and an exhaust port 102, as will be described in further detail herein. The exhaust port 102 leads to an exhaust chamber 104. The exhaust chamber 104 is normally separated from the recess 94 by a second elastomeric diaphragm 106. The fixed housing member 74 and movable housing member 76 include a plurality of circumferential grooves 110 which receive elastomeric o-rings 112 for sealing the plug and seat valve assembly 52 within the main housing 73.

Each movable valve plug 78 is slidably disposed within one of the fixed housing members 74 and one of the movable housing members 76. More specifically, each valve plug 78 includes a substantially cylindrical central shaft 114 having first and second opposed heads 116, 118. The first head 116 is sized to engage the fixed valve seat 86 in sealing engagement, and the second head 118 is sized to engage the movable valve seat 93 of the movable housing member 76 in sealing engagement. Each valve plug 78 further includes a rear mount 120 connected to a spring 122 to bias the valve plug 78 into the closed position shown in FIG. 2.

The actuation beam 70 includes first and second lever arms 124, 126 extending from the central pivot 72. A first appendage 127 is provided at an end 128 of the first lever arm 124, and a second appendage 130 is provided at an end 132 of the second lever arm 126. Each appendage 127, 130 is received within one of the lower rings 90. An actuation pad 137 is provided on the actuation beam 70 opposite each of the first and second appendages 127, 130.

In the position shown in FIG. 3, it will be noted that the left movable housing member 76 has moved downwardly with respect to the valve plug 78 associated therewith, which in turn moves the second head 118 of the valve plug 78 out of engagement with the movable valve seat 93. The first head 116 remains in engagement with the fixed valve seat due to the spring 122. In so doing, a pathway designated by arrows a is created which fluidically connects the recess 94 with the exhaust port 102 and exhaust chamber 104.

With respect to the right movable housing member 76, it has moved upwardly in FIG. 3, as dictated by the pivotal motion of the actuation beam 70. In so doing the movable valve seat 93 remains in engagement with the second head 118, but the first head 116 has moved out of engagement with the fixed valve seat 86. The spring 122 deforms to allow this motion. As a result, a pathway β is created allowing fluid flow between the inlet 80 and the outlet 82.

The pressure in the recess 94 on the left therefore provides a relatively low output pressure to the actuator 36, while the pressure in the recess 94 on the right provides a relatively high output pressure to the actuator 36 in the depicted position. In the case of a piston actuator, such signals would be fed to upper and lower pressure chambers to move the piston up or down. In other applications, both signals need not be utilized.

The force required to cause the valve plug 78 to move upwardly is imparted thereto by the electropneumatic relay actuator 50. The electropneumatic relay 50 generates a signal 64 which increases the pressure within an actuation chamber 138 between pad 137 of the actuation beam 70 and a base 142 of the plug and seat valve assembly 52. An elastomeric diaphragm 144 isolates the actuation chamber 138.

Bias chamber 145 exerts a force on the actuation beam 70 counter to the force exerted by the actuation chamber 138. Thus, when the pressure within the actuation chamber 138 lessens, the bias chamber 145 causes the actuation beam 70 to move in an opposite direction. The bias chamber 145 may include a spring or an independent pressure feed to create the bias, but is preferably in fluid communication with supply pressure to create the bias.

One of ordinary skill in art will therefore appreciate that the valve plugs 78 can be moved to any position along a range of motion defined by FIGS. 2–4 depending upon the signal imparted to the actuation chamber 138 by the electropneumatic relay actuator 50. If the pressure in the actuation chamber 138 is increased to be greater than the pressure in the bias chamber 145, the valve plug 78 proximate the actuation chamber 138 moves upwardly, and the other valve plug 78 moves downwardly. Conversely, if pressure in the actuation chamber 138 is decreased to be less than that in the bias chamber 145, the valve plug 78 proximate the bias chamber 145 moves upwardly, and the valve plug 78 proximate the actuation chamber 138 moves downwardly. Depending on the positions of the valve plug 78, the resulting output signals to the actuator 36 are adjusted, which in turn adjusts the position of the control valve 22.

By monitoring the positions of the valve plugs 78 using the second control loop 30 as indicated above, the position of the plugs 78 can be accurately controlled, which in turns improves the accuracy and responsiveness with which the position of control valve 22 can be controlled.

Figure 5:
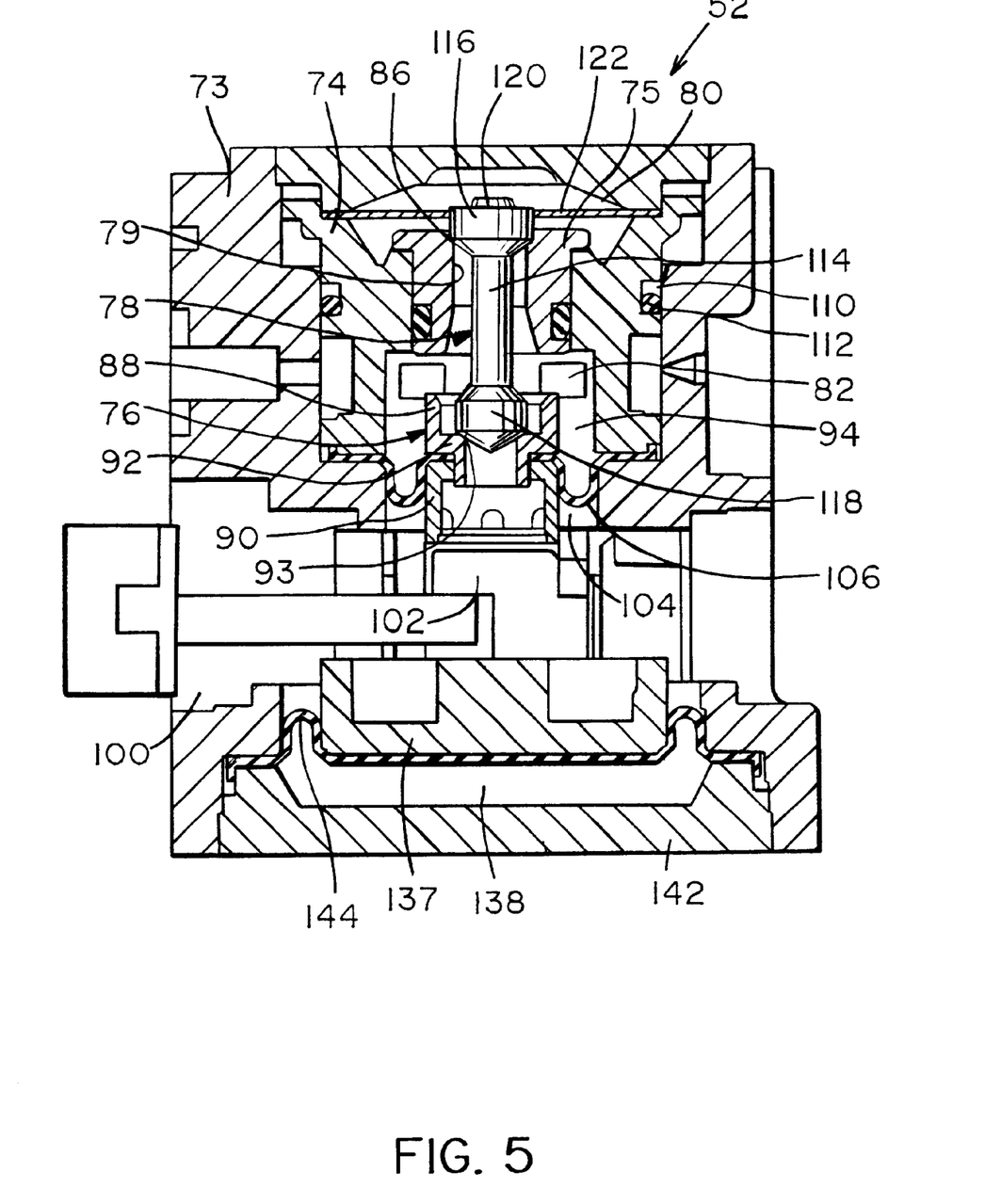
FIG. 5 is a sectional view of a second embodiment of a plug and seat valve constructed in accordance with the teachings of the invention.

Referring now to FIG. 5, a second preferred embodiment of the plug and seat valve assembly 52 is depicted. The mechanics for the plug and seat valve 52 are identical to that disclosed with respect to the first preferred embodiment, although only a single plug and seat valve is used. Thus, wherein like elements are employed, like reference numerals are used.

Figure 6:
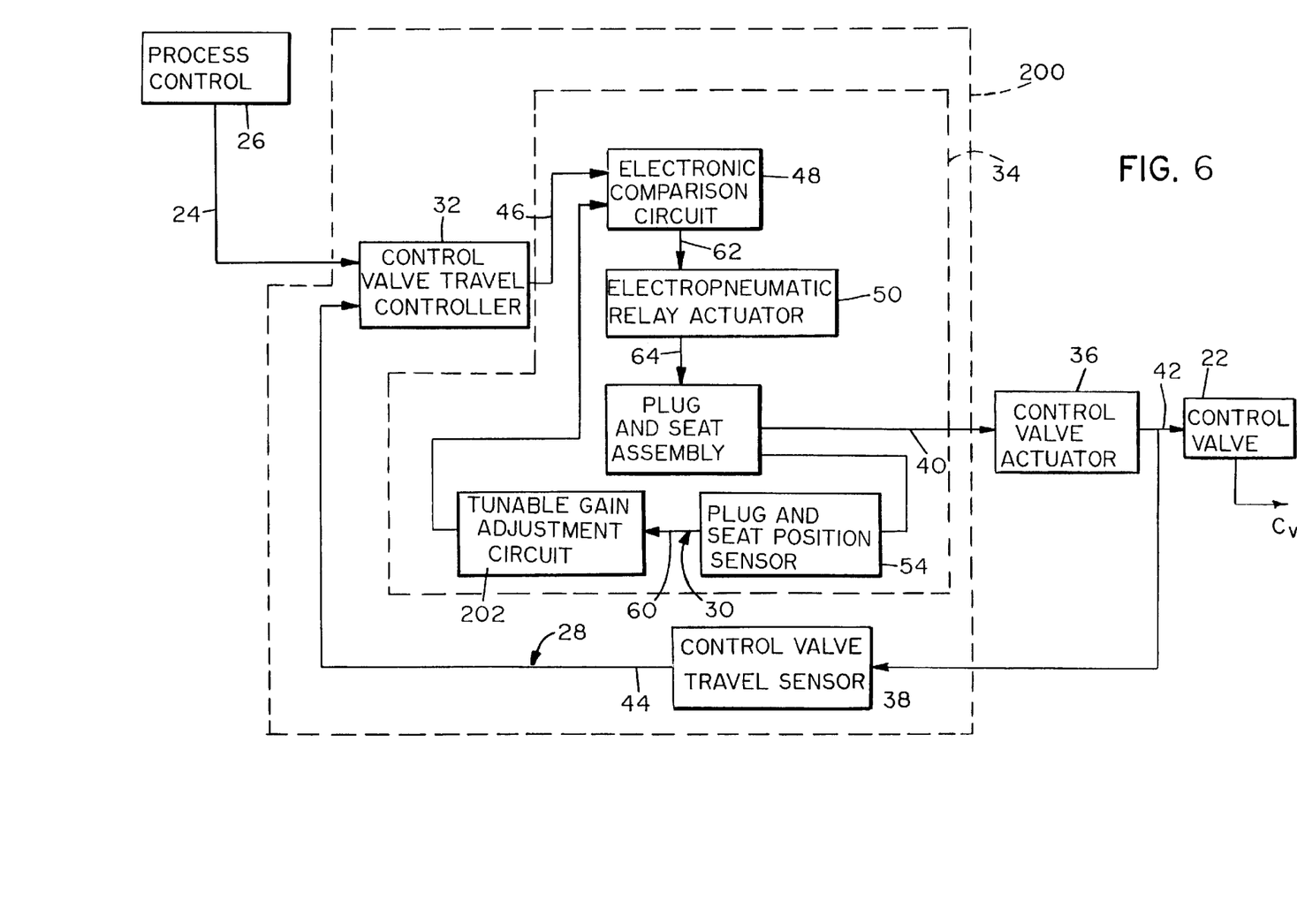
FIG. 6 is a block diagram of a second embodiment of a control valve positioning system constructed in accordance with the teachings of the invention.

Referring now to FIG. 6, a second alternative embodiment for a positioning system built in accordance with the teachings of the inventions generally depicted by reference numeral 200. The system 200 is substantially the same as the first preferred embodiment, and thus wherein like elements are employed, like referenced numerals are used. One difference with regard to the alternative embodiment of FIG. 6, however, is the use of a tunable gain adjustment circuit 202. The tunable gain adjustment circuit 202 provides the user with a mechanism for adjusting the span of the position signal 58 which is fed back into the positioning processor 48. This results in a method for tuning the response of the positioning system 200. For example, the tunable gain adjustment circuit 202 may consist of a proportional loop which multiplies the signal of positioning processor 48 by a constant. One of ordinary skill in the art will recognize that in addition to a proportional loop, an integrating loop can be used to provide PI control, and that a derivative loop can be used as well to result in a PID control system. The use of the tunable gain adjustment circuit 202 need not be limited to systems employing plug and seat valves, but rather can be employed in systems employing any type of valve, including spool valves.

Figure 7:
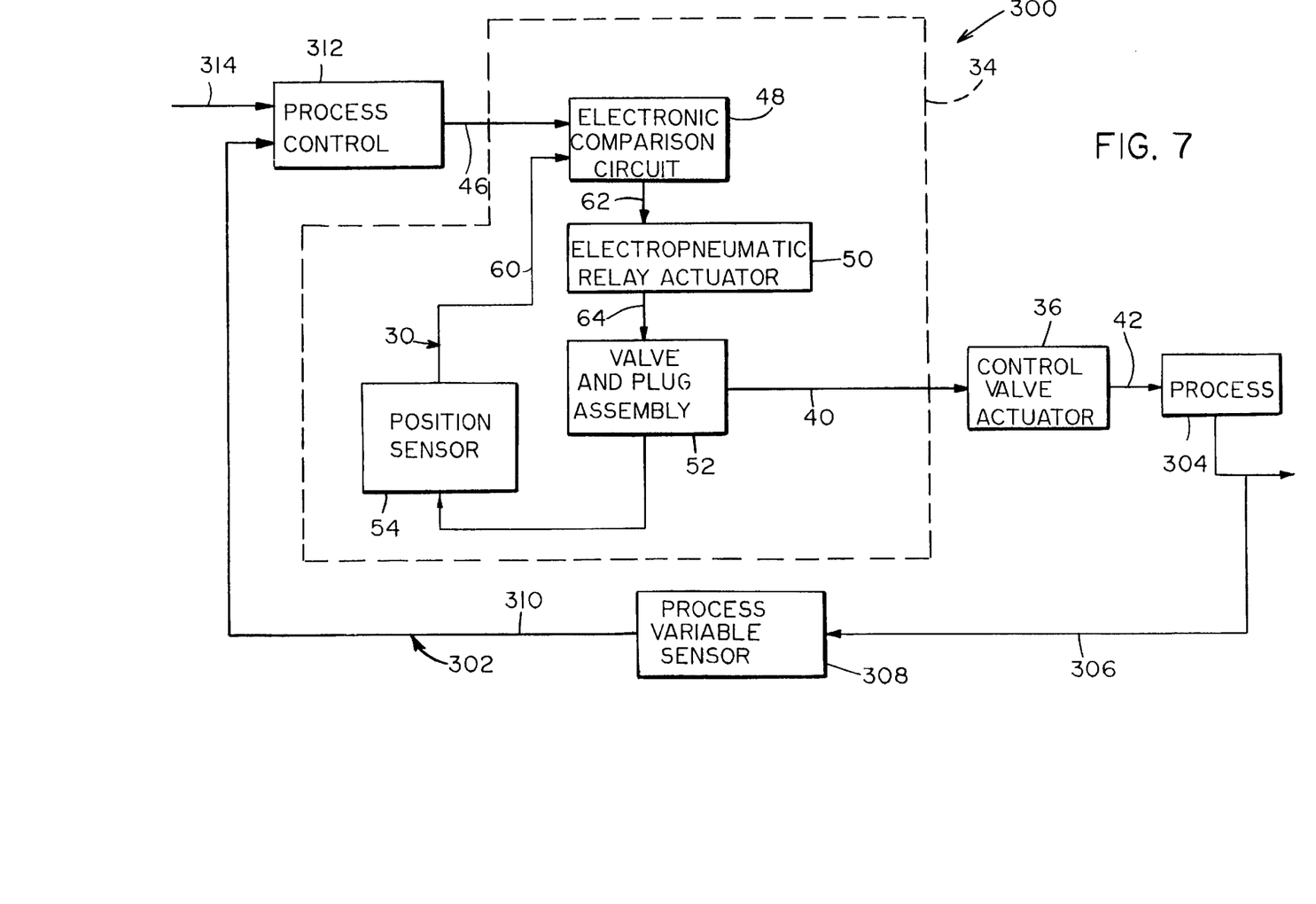
FIG. 7 is a block diagram of a third embodiment of a control valve positioning system constructed in accordance with the teachings of the invention.

Referring now to FIG. 7, a third preferred embodiment for a positioning system constructed in accordance with the teachings of the invention is generally depicted by reference numeral 300. As shown therein, the first control loop 28 need not monitor the position of the control valve 22, and compare the resulting signal to a control signal setpoint 24, but rather the teachings of the invention can be employed to provide a control loop 302 which monitors other variables as well. In the depicted embodiment, the other variable may be a variable specifically related to the process 304 being controlled. For example, in a chemical processing facility, various reservoirs may be drawn upon and the level within a reservoir may need to be continuously monitored. In such an example, the process variable signal 306 may be representative of the volume remaining within a reservoir. This volume may be monitored by a suitable volume sensor 308 with the sensor 308 generating a signal 310 indicative thereof and transmitting the signal 310 to a process controller 312. The process controller 312 may then in turn compare the measured process signal 310 to a process setpoint 314 provided thereto by a higher level processor (not shown). The remainder of the system 300 is identical in that a plug and seat valve assembly 52 and an inner loop control is employed for directing a pressure signal to a control valve actuator.

From the foregoing, it can be seen that systems constructed in accordance with the teachings of the invention provide enhanced damping, accuracy and responsiveness in the parameter being controlled.

What is claimed is:

1. A control valve assembly, comprising:

a control valve;

a plug and seat valve operatively associated with the control valve;

a first position sensor adapted to monitor the position of the control valve and generate a first position signal;

a second position sensor adapted to monitor the position of the plug and seat valve assembly and generate a second position signal; and a comparator adapted to compare the first position signal to a first setpoint and generate a second setpoint, the comparator further adapted to compare the second position signal to the second setpoint and generate a correction signal, the correction signal being communicated to the plug and seat valve assembly for positioning the control valve.

2. The control valve assembly of claim 1, wherein the plug and seat valve assembly includes a fixed valve seat, a movable valve seat, and a plug having first and second heads receivable in the fixed and movable valve seats, respectively.

3. The control valve assembly of claim 1, wherein at least one of the first and second position sensors is a potentiometer.

4. The control valve assembly of claim 1, wherein at least one of the first and second position sensors is a giant magnetoresistive device.

5. The control valve assembly of claim 1, wherein at least one of the first and second position sensors is a Hall effect sensor.

6. The control valve assembly of claim 1, further including a tunable gain adjustment circuit adapted to modify the second position signal.

7. The control valve assembly of claim 1, further including proportional, integrating, or derivative control circuits.

8. The control valve assembly of claim 1, further including a control valve actuator adapted to receive a pressure signal from the plug and seat assembly and generate mechanical motion for driving the control valve to a desired position.

9. The control valve assembly of claim 8, further including a transducer adapted to receive the electrical correction signal from the comparator and generate a pressure signal for communication to the plug and seat valve assembly.

10. The control valve assembly of claim 1, wherein the plug and seat valve includes first and second plug and seat valve assemblies joined together by a common actuation beam, motion of one of the first and second plug and seat valve assemblies in a first direction causing motion of the other of the first and second plug and seat valve assemblies in a second, opposing direction.

11. The control valve assembly of claim 10, wherein a movable seat of the plug and seat valve assembly is formed by a ring mounted to the actuation beam.

12. A valve control system, comprising:

a control valve;

a control valve actuator operatively associated with the control valve and adapted to modify the position of the control valve;

a first position sensor proximate the control valve adapted to sense the position of the control valve and generate a signal indicative of control valve position;

a plug and seat valve in fluid communication with the control valve actuator, the plug and seat valve adapted to generate a pressure signal for use by the control valve actuator;

a first comparator adapted to compare the control valve position to a control valve setpoint and generate a plug and seat valve position setpoint;

a second position sensor proximate the plug and seat valve adapted to sense the position of the plug and seat valve and generate a signal indicative of plug and seat valve position;

a second comparator adapted to compare the plug and seat valve position to the plug and seat valve position setpoint and generate a plug and seat valve correction signal; and a transducer adapted to receive the plug and seat valve correction signal and generate a corresponding pressure signal for communication to the plug and seat valve.

13. The valve control system of claim 12, wherein the plug and seat valve includes at least one plug and seat valve assembly.

14. The valve control system of claim 12, wherein at least one of the position sensors is a potentiometer.

15. The valve control system of claim 12, wherein the position sensors are Hall effect sensors.

16. The valve control system of claim 12, further including a tunable gain adjustment circuit adapted to modify the signal indicative of plug and seat valve position.

17. The valve control system of claim 12, wherein the plug and seat valve includes first and second plug and seat valve assemblies tied together by a actuation beam.

18. The valve control system of claim 17, wherein each plug and seat valve assembly includes a fixed valve seat, a movable valve seat, and a plug having first and second heads receivable in the fixed and movable valve seats, respectively.

19. The valve control system of claim 18, wherein the movable seat of the plug and seat valve assembly is formed by a ring mounted to the actuation beam.

20. A system for positioning a control valve driven by a control valve actuator, wherein the control valve actuator is in communication with a plug and seat valve, comprising:

a first control loop in which a signal indicative of control valve position is compared to a first setpoint to generate a second setpoint; and a second control loop in which a signal indicative of plug and seat valve position is compared to the second setpoint to generate a control valve actuator drive signal, the control valve actuator drive signal being communicated to the control valve actuator for positioning the control valve.

21. The system of claim 20, wherein the first setpoint is provided by a controller of a process line in which the control valve is used.

22. The system of claim 21, wherein the first control loop compares a sensed variable of the process to the first setpoint to generate the second setpoint.

23. A system for positioning a control valve driven by a control valve actuator, the control valve actuator being in communication with a control valve actuator valve, the system comprising:

a first control loop in which a signal indicative of control valve position is compared to a first setpoint to generate a second setpoint;

a second control loop in which a signal indicative of control valve actuator valve position is compared to the second setpoint to generate a control valve actuator drive signal, the control valve actuator drive signal being communicated to the control valve actuator for positioning the control valve; and a tunable gain adjustment circuit in the second control loop, the tunable gain adjustment circuit adapted to modify the signal indicative of control valve actuator valve position.

24. The system of claim 23 wherein the control valve actuator valve is a plug and seat valve.

25. A method for positioning a control valve, comprising the steps of:

monitoring the position of the control valve;

comparing the position of the control valve to a first setpoint;

generating a second setpoint based on the comparing step;

monitoring the position of a plug and seat valve;

comparing the position of the plug and seat valve to the second setpoint;

generating a correction signal based on the comparison of the plug and seat valve position to the second setpoint; and positioning the control valve based on the correction signal.

26. The method of claim 25, wherein the monitoring steps are performed using Hall effect sensors.

27. The method of claim 26, wherein the positioning step is performed using a current to pressure transducer, and a control valve actuator.

* * * * *